US010072121B1

(12) United States Patent
Kobilka et al.

(10) Patent No.: US 10,072,121 B1
(45) Date of Patent: Sep. 11, 2018

(54) BOTTLEBRUSH POLYMERS DERIVED FROM POLY(METHYLIDENELACTIDE)

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/452,996

(22) Filed: Mar. 8, 2017

(51) Int. Cl.
*C08F 24/00* (2006.01)
*C08G 63/91* (2006.01)

(52) U.S. Cl.
CPC .................. *C08G 63/912* (2013.01)

(58) Field of Classification Search
USPC .......................................................... 528/357
See application file for complete search history.

(56) References Cited

U.S. PATENT DOCUMENTS

| 4,065,428 | A | 12/1977 | Deets |
| 5,137,953 | A | 8/1992 | Fuhr et al. |
| 5,852,117 | A | 12/1998 | Schoenberg et al. |
| 6,316,581 | B1 | 11/2001 | Gross et al. |
| 6,339,166 | B1 | 1/2002 | Allcock et al. |
| 6,740,731 | B2 | 5/2004 | Bigg et al. |
| 7,071,288 | B2 | 7/2006 | Smith et al. |
| 7,709,569 | B2 | 5/2010 | Rafailovich et al. |
| 8,741,877 | B2 | 6/2014 | Moller et al. |
| 9,029,497 | B2 | 5/2015 | Li et al. |
| 9,169,334 | B2 | 10/2015 | Stewart et al. |
| 9,193,818 | B1 | 11/2015 | Boday et al. |
| 9,228,044 | B2 | 1/2016 | Boday et al. |
| 9,260,550 | B1 * | 2/2016 | Boday .................. C08F 124/00 |
| 9,346,915 | B2 | 5/2016 | Nemoto et al. |
| 2006/0264573 | A1 | 11/2006 | Bennett et al. |
| 2006/0270779 | A1 | 11/2006 | Mochizuki et al. |
| 2008/0114132 | A1 | 5/2008 | Daly et al. |
| 2009/0054619 | A1 | 2/2009 | Baker et al. |
| 2009/0259000 | A1 | 10/2009 | Urakami et al. |
| 2009/0306333 | A1 | 12/2009 | Jing et al. |
| 2013/0035429 | A1 | 2/2013 | Tajima |
| 2013/0302620 | A1 | 11/2013 | Fenn et al. |
| 2014/0213732 | A1 * | 7/2014 | Stewart .................... C08F 8/10 525/290 |
| 2015/0018493 | A1 | 1/2015 | Mehrkhodavandi et al. |
| 2015/0284506 | A1 * | 10/2015 | Boday .................. C08F 257/02 525/333.3 |
| 2016/0215079 | A1 * | 7/2016 | Boday .................. C08F 124/00 |

FOREIGN PATENT DOCUMENTS

| CN | 101225224 A | 7/2008 |
| CN | 104371082 A | 2/2015 |
| EP | 0 765 889 A1 | 4/1997 |
| EP | 0 964 027 B1 | 5/2004 |
| EP | 2 013 288 B1 | 2/2013 |
| KR | 10-2011-0113947 | 5/2013 |
| WO | WO-90/01521 A1 | 2/1990 |
| WO | WO-03/027175 A1 | 4/2003 |
| WO | WO-2012/015128 A1 | 2/2012 |
| WO | WO-2012/169761 A2 | 12/2012 |
| WO | WO-2016/134178 A1 | 8/2016 |

OTHER PUBLICATIONS

Fuoco et al., *A Route to Aliphatic Poly(ester)s with Thiol Pendant Groups: From Monomer Design to Editable Porous Scaffolds*, BioMacromolecules, Feb. 2016, vol. 17, No. 4, pp. 1383-1394, American Chemical Society Publications, Washington, D.C.
Partlo III, *Reductively Degradable Polymeric Biomaterials*, Dissertation, Jan. 2015, 111 pages, University of Minnesota, USA.
Li et al., *Highly-effective Flame Retardancy of Poly(lactide) Composite Achieved Through Incorporation of Amorphous Nickel Phosphate Microparticle*, Polymer-Plastics Technology and Engineering, Aug. 2014, vol. 53, Issue 15, pp. 1533-1541, Taylor & Francis Group, an Informa Business, London.
Jing et al., *A Bifunctional Monomer Derived from Lactide for Toughening Polylactide*, Journal of the American Chemical Society (JACS) Communications, Sep. 2008, vol. 130, Issue 42, pp. 13826-13827, American Chemical Society Publications, Washington, D.C.
Price et al., *Flame retardance of poly(methyl methacrylate) modified with phosphorus-containing compounds*, Polymer Degradation and Stability, Mar. 2002, vol. 77, Issue 2, pp. 227-233, Elsevier Science Ltd, Amsterdam, Netherlands.
*Altuglas International and NatureWorks Launch Worldwide Marketing Collaboration for New High Performance Alloys Incorporating Ingeo(TM) Biopolymers*, globenewswire.com (online), Dec. 11, 2012, 2 pages, URL: globenewswire.com/news-release/2012/12/11/510816/10015271/en/Altuglas-International-and-NatureWorks-Launch-Worldwide-Marketing-Collaboration-for-New-High-Performance-Alloys-Incorporating-Ingeo-TM-Biopolymers.html.
Abayasinghe et al., *Terpolymers from Lactide and Bisphenol A Derivatives: Introducing Renewable Resource Monomers into Commodity Thermoplastics*, Macromolecules, vol. 36, No. 26, Dec. 2003, pp. 9681-9683, American Chemical Society, Washington, D.C.
Britner et al., *Self-Activation of Poly(methylenelactide) through Neighboring-Group Effects: A Sophisticated Type of Reactive Polymer*, Macromolecules, vol. 48, No. 11, May 2015, pp. 3516-3522, American Chemical Society, Washington, D.C.
Buffet et al., *Alkaline earth metal amide complexes containing a cyclen-derived (NNNN) macrocyclic ligand: synthesis, structure, and ring-opening polymerization activity towards lactide monomers*, New Journal of Chemistry, vol. 35, No. 10, Jul. 2011, pp. 2253-2257, Royal Society of Chemistry, London.

(Continued)

Primary Examiner — Terressa Boykin
(74) Attorney, Agent, or Firm — Roy R. Salvagio; Robert R. Williams; Kennedy Lenart Spraggins LLP (57) ABSTRACT

A process of forming a bottlebrush polymer includes forming a poly(methylidenelactide) (PML) material from an L-lactide molecule. The process also includes forming a lactide feedstock that includes a blend of a first amount of an L-lactide monomer and a second amount of the PML material. The process further includes polymerizing the lactide feedstock to form a bottlebrush polymer.

20 Claims, 4 Drawing Sheets

(56) References Cited

OTHER PUBLICATIONS

Noga et al., *Synthesis and Modification of Functional Poly(lactide) Copolymers: Toward Biofunctional Materials*, Biomacromolecules, vol. 9, No. 7, Jun. 2008, pp. 2056-2062, American Chemical Society, Washington, D.C.

AUS920170022US1, Appendix P; List of IBM Patent or Applications Treated as Related, Jun. 1, 2017, 2 pages.

Mauldin et al., *An Acrylic Platform from Renewable Resources via a Paradigm Shift in Lactide Polymerization*, ACS Macro Letters, 2016, 5 (4), American Chemical Society, DOI: 10.1021/acsmacrolett.6b00023, Publication Date (Web): Apr. 8, 2016, 3 pages.

IBM, *IBM Academy of Technology Top 10 Technical Themes 2016*, IBM.com (online), accessed Jan. 16, 2017, 2 pages, URL: http://www-03.ibm.com/ibm/academy/tech/tech.shtml.

Verduzco et al., *Structure, function, self-assembly, and applications of bottlebrush copolymers*, Chemical Society Review, Feb. 2015, vol. 44, pp. 2405-2420, The Royal Society of Chemistry, UK.

Scheibelhoffer et al., *Synthesis, Polymerization and Copolymerization of Dimethyleneglycolide and Methylenemethylglycolide*, Polymer Preprints, vol. 10, No. 2, Sep. 1969, pp. 1375-1380, Division of Polymer Chemistry, American Chemical Society, Washington D.C.

Gerhardt et al., *Functional Lactide Monomers: Methodology and Polymerization*, Biomacromolecules, vol. 7, No. 6, published on web May 24, 2006, pp. 1735-42, American Chemical Society, Washington, D.C.

U.S. Appl. No. 15/452,914, to Brandon M. Kobilka et al., entitled, *Flame Retardant Lactide Monomors For Polylactide Synthesis*, assigned to International Business Machines Corporation, 47 pages, filed Mar. 8, 2017.

U.S. Appl. No. 15/453,104, to Brandon M. Kobilka et al., entitled, *Lactide Copolymers And Ring-Opened Lactide Copolymers*, assigned to International Business Machines Corporation, 24 pages, filed Mar. 8, 2017.

U.S. Appl. No. 15/452,880, to Brandon M. Kobilka et al., entitled, *Matrix-Bondable Lactide Monomors For Polylactide Synthesis*, assigned to International Business Machines Corporation, 39 pages, filed Mar. 8, 2017.

\* cited by examiner

BOTTLEBRUSH POLYMERS DERIVED FROM POLY(METHYLIDENELACTIDE)

BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

SUMMARY

According to an embodiment, a process of forming a bottlebrush polymer is disclosed. The process includes forming a poly(methylidenelactide) (PML) material from an L-lactide molecule. The process also includes forming a lactide feedstock that includes a blend of a first amount of an L-lactide monomer and a second amount of the PML material. The process further includes polymerizing the lactide feedstock to form a bottlebrush polymer.

According to another embodiment, a process of forming a bottlebrush polymer is disclosed. The process includes forming a mixture that includes a PML material and a diol. The process also includes performing a ring-opening polymerization reaction on the mixture to form a PML-based polyester material. The process further includes chemically reacting the PML-based polyester material with a lactone to form a bottlebrush polymer.

According to another embodiment, a process of forming a bottlebrush polymer is disclosed. The process includes forming a methylidene lactide molecule from a biorenewable L-lactide molecule. The process also includes initiating a radical polymerization reaction using a radical initiator to form a poly(methylidenelactide) (PML) material from the methylidene lactide molecule. The process further includes forming a mixture that includes the PML material or a PML-based polyester material derived from the PML material. The process includes polymerizing the mixture to form a bottlebrush polymer.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes bottlebrush polymers derived from a poly(methylidenelactide) material (also referred to herein as a "PML material") and processes of forming such bottlebrush polymers. In the present disclosure, the PML material is synthesized from the biorenewable L-lactide molecule. In some cases, the bottlebrush polymers of the present disclosure may be grown either directly from the lactide rings of the PML material using ring-opening polymerization with L-lactide. In other cases, the bottlebrush polymers of the present disclosure may be grown from a modified PML material using biorenewable lactones. In some cases, the PML-based bottlebrush polymers of the present disclosure may be utilized as standalone biorenewable polymeric materials. In other cases, the PML-based bottlebrush polymers of the present disclosure may be incorporated into a material to increase the biorenewable content of the material.

Figure 1A:
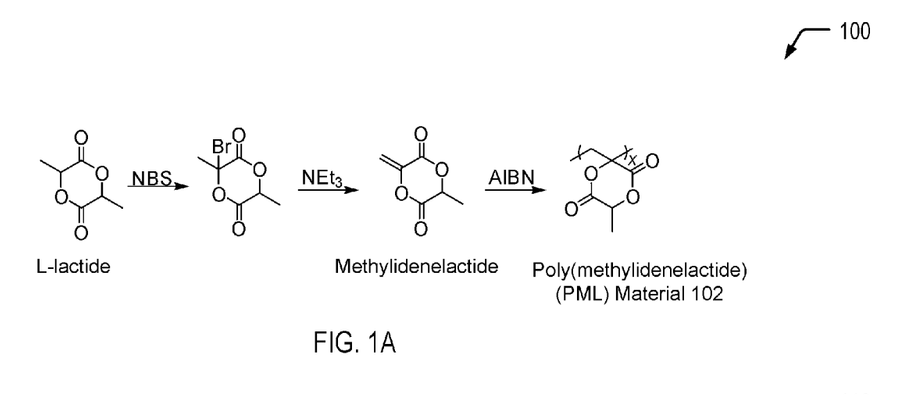
FIG. 1A is a chemical reaction diagram illustrating an example of a multiple-stage process of synthesizing a poly (methylidenelactide) material (also referred to herein as a "PML" material) from the biorenewable L-lactide molecule, according to one embodiment.

Referring to FIG. 1A, a chemical reaction diagram 100 illustrates an example of a multiple-stage process of synthesizing a PML material 102 from the biorenewable L-lactide molecule, according to an embodiment. In FIG. 1A, starting from the biorenewable L-lactide molecule, radical bromination/elimination/radical polymerization reactions may be used to synthesize the PML material 102. As illustrated and further described herein with respect to FIGS. 1B, 2A, and 2B, the PML material 102 of FIG. 1A may be subsequently utilized to form various examples of bottlebrush polymers.

The first chemical reaction depicted in FIG. 1A illustrates that, starting from an L-lactide molecule, radical monobromination at the carbon alpha to the carbonyl results in the addition of a bromide group to the L-lactide molecule. In a particular embodiment, the mono-brominated lactide molecule may be formed by radical bromination of the alpha carbon position of the L-lactide molecule by N-bromosuccinimide (NB S) using a radical initiator such as benzoyl peroxide in a solvent such as benzene, among other alternatives. The second chemical reaction depicted in FIG. 1A illustrates that elimination with triethylamine ($NEt_3$) in a solvent such as dichloromethane (DCM) results in the formation of a methylidenelactide molecule.

The third chemical reaction depicted in FIG. 1A illustrates that a radical polymerization reaction (e.g., including a radical initiator, such as azobisisobutyronitrile (AIBN), among other alternatives) may be used to form the PML material 102 from the methylidene lactide molecule. In FIG. 1A, the integer x is used to represent a number of repeat units in the PML material 102 that include a lactide ring bound to a polyethylene (PE) backbone. One of ordinary skill in the art will appreciate that the number of repeat units in the PML material 102 may be adjusted for tailoring of a PE portion of a PLA-PE material formed from the PML material 102, as described further herein with respect to FIG. 1B.

As a prophetic example, methylidenelactide (2.0 g, 14 mmol) and AIBN (24 mg, 0.15 mmol) may be dissolved in 20 mL tetrahydrofuran (THF) under a dry argon atmosphere in a pressure flask with a Teflon screw top and stirred at 60° C. for 30 hours. The solution may be cooled to room temperature and precipitated into a 20x excess volume of chloroform. The solid product may be filtered, re-dissolved in about 20 ml hot tetrahydrofuran over the course of several hours, and precipitated again in a 20x excess volume of hexanes. The resulting solid may be dried in a vacuum oven at 85° C. until complete removal of volatiles (determined by thermogravimetric analysis).

Figure 1B:
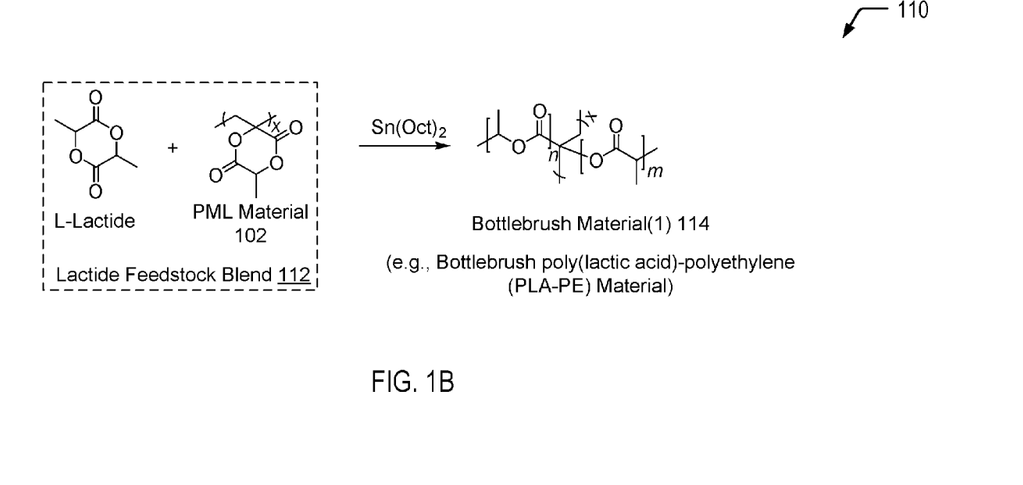
FIG. 1B is a chemical reaction diagram illustrating an example of a process of utilizing the PML material of FIG. 1A to form a first example of a bottlebrush polymer, according to one embodiment.

Referring to FIG. 1B, a chemical reaction diagram 110 illustrates an example of a process of utilizing the PML material 102 of FIG. 1A to form an example of a first bottlebrush material 114 (identified as "Bottlebrush Material (1)" in FIG. 1B). The first bottlebrush material 114 may be formed from a blend 112 (identified as "Lactide Feedstock Blend" in FIG. 1B) that includes an unmodified L-lactide monomer and the PML material 102 of FIG. 1A. In the particular embodiment depicted in FIG. 1B, the first bottlebrush material 114 corresponds to an example of a bottlebrush poly(lactic acid)-polyethylene (PLA-PE) material. In a particular embodiment, the first bottlebrush material 114 may be synthesized by performing a ring-opening polymerization that includes the use of Lewis acid conditions, such as heating as a melt with a metal catalyst, such as tin(II) octanoate (identified as "SnOct$_2$" in FIG. 1B).

In a particular embodiment, the blend 112 may include a first amount of the "conventional" L-lactide monomer and a second amount of the PML material 102 of FIG. 1A. In FIG. 1B, the integers m and n are used to identify the PLA portions of the PLA-PE material that results from ring-opening of the lactide rings in each of the monomers of the blend 112, and the integer x is used to identify a PE portion of the PLA-PE material. For example, the integer m may correspond to a first PLA portion of the PLA-PE material that results from ring-opening of the lactide ring of the L-lactide monomer. The integer n may correspond to a second PLA portion of the PLA-PE material that results from ring-opening of the lactide rings of the PML material 102. As the PML material 102 includes a single lactide ring per repeat unit, the integer x may be proportional to the integer n. One of ordinary skill in the art will appreciate that the relative amounts of "conventional" L-lactide monomer and PML material 102 in the blend 112 may be adjusted in order to tailor the material properties of the first bottlebrush material 114.

Thus, FIGS. 1A and 1B illustrate an example in which a PML material is synthesized from the biorenewable L-lactide molecule, and a bottlebrush polymer (e.g., a bottlebrush PLA-PE material) is grown directly from the lactide rings of the PML material using ring-opening polymerization with L-lactide. In some cases, the bottlebrush PLA-PE material depicted in FIG. 1B may be utilized as a standalone biorenewable polymeric material. In other cases, the bottlebrush PLA-PE material depicted in FIG. 1B may be incorporated into a material to increase the biorenewable content of the material.

Figure 2A:
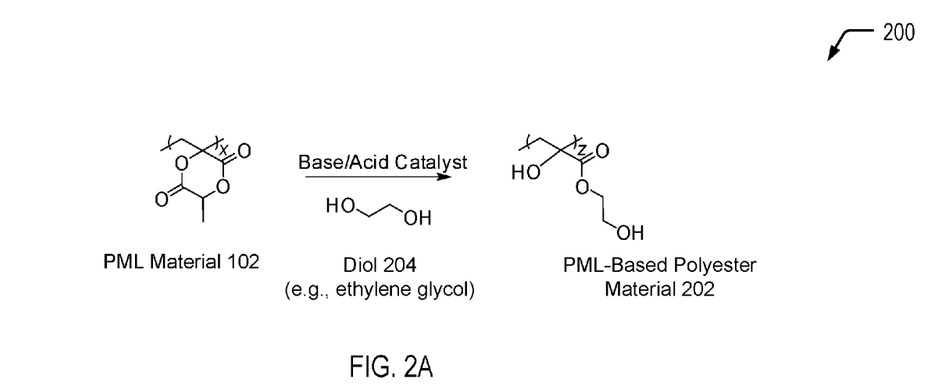
FIG. 2A is a chemical reaction diagram illustrating an example of a process of forming a modified PML-based material from the PML material of FIG. 1A, according to one embodiment.

Referring to FIG. 2A, a chemical reaction diagram 200 illustrates an example of a process of modifying the PML material 102 of FIG. 1A to form a PML-based polyester material 202, according to one embodiment. As illustrated and further described herein with respect to FIG. 2B, the PML-based polyester material 202 of FIG. 2A may be subsequently utilized to form a bottlebrush polymer that is different from the bottlebrush PLA-PE material depicted in FIG. 1B.

The first chemical reaction depicted in FIG. 2A illustrates that the PML material 102 of FIG. 1A may be chemically reacted with a diol 204 to form the PML-based polyester material 202, according to one embodiment. In the particular embodiment depicted in FIG. 2A, the diol 204 includes ethylene glycol. In other cases, the diol 204 may include propylene glycol, among other alternative and/or additional diols that may be selected to tailor the final properties of a particular material. In a particular embodiment, the lactide ring on the PML material 102 may be converted into a terminal alcohol. In some cases, converting the lactide ring into a terminal alcohol may include performing a base-catalyzed ring-opening polymerization (e.g., using an amine base) of the PML material 102 in the presence of the diol 204. In other cases, converting the lactide ring of the PML material 102 into a terminal alcohol may include performing an acid-catalyzed ring-opening polymerization of the PML material 102 in the presence of the diol 204. In some cases, the diol 204 may be a "mono-protected" ethylene glycol to avoid potential cross-linking reactions. As an illustrative, non-limiting example, 2-(trimethylsiloxy)-ethanol may be used, and appropriate chemicals may be used after reaction with the polymer to remove the silyl group (e.g., using a fluoride source such as TBAF or a mild acid). Alternative protecting groups may be used in other cases.

As a prophetic example, poly(methylidenelactide) (0.2 g) may be dissolved in 100 ml of a hot 1:1 (v:v) solution of tetrahydrofuran:ethylene glycol. The flask may be sealed under a dry, argon atmosphere, brought to the desired temperature, and triazabicyclodecene (TBD) (2 mg, 0.014 mmol) dissolved in a minimal amount of ethylene glycol may be added by syringe. After 24 hours, a 10x excess (relative to TBD) of benzoic acid dissolved in a minimal amount of methanol may be added in order to quench the initiator, and the solution may be brought to room temperature. The solution may be added directly to hexane, dropwise, to precipitate the polymer, which may be collected by filtration, and dried in a vacuum oven at >60° C. until complete removal of volatiles (determined by thermogravimetric analysis).

As previously described herein with respect to FIG. 1A, the integer x is used to represent a number of repeat units in the PML material 102 that include a lactide ring bound to the PE backbone. In FIG. 2A, the integer z is used to represent the number of repeat units in the PML-based polyester material 202 that include an ester group and the two hydroxyl groups bound to a PE backbone of the PML-based polyester material 202 after ring-opening polymerization of the PML material 102 in the presence of the diol 204. As the PML material 102 includes a single lactide ring per repeat unit, the integer x may be proportional to the integer z.

Figure 2B:
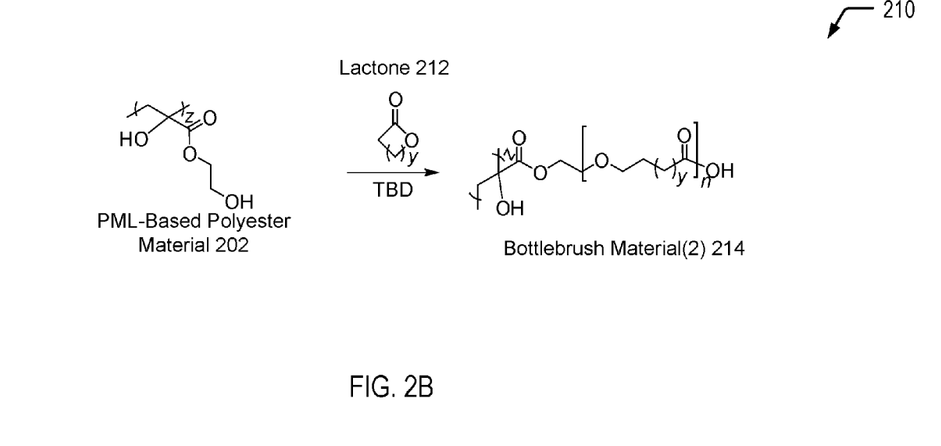
FIG. 2B is a chemical reaction diagram illustrating an example of a process of utilizing the modified PML-based material of FIG. 2A to form a second example of a bottlebrush polymer, according to one embodiment.

Referring to FIG. 2B, a chemical reaction diagram 210 illustrates an example of a process of utilizing the PML-based polyester material 202 of FIG. 2A to form a second example of a bottlebrush material 214 (identified as "Bottlebrush Material(2)" in FIG. 2B), according to one embodiment. FIG. 2B illustrates an example of a renewable polyester that may be grown from the terminal hydroxyl groups of the PML-based polyester material 202 of FIG. 2A using a lactone 212 and a Lewis-basic catalyst, such as triazabicyclodecene (TBD), resulting in the formation of the second bottlebrush material 214.

In the example depicted in FIG. 2B, the integer y in the lactone 212 is used to illustrate that various lactones or combinations of lactones may include different numbers of carbon atoms in the lactone ring. To illustrate, lactones are typically named according to the precursor acid molecule (e.g., aceto=2 carbon atoms; propio=3; butyro=4; valero=5, capro=6, etc.) and a Greek letter prefix specifies the number of carbon atoms in the heterocycle (i.e., the distance between the relevant —OH group and the —COOH group along the backbone). To illustrate, the lactone 212 may correspond to β-propiolactone (where y=1), γ-butyrolactone (where y=2); δ-valerolactone (where y=3); or ε-caprolactone (where y=4). One of ordinary skill in the art will appreciate that one or more alternative and/or additional lactones, or combinations thereof, may be utilized. Further, one of ordinary skill in the art will appreciate that, with respect to the co-polymerization reaction depicted in FIG. 2B, the relative amounts of the PML-based polyester material 202 of FIG. 2A and the lactone 212 may be adjusted in order to tailor the material properties of the resulting bottlebrush material 214.

In a particular embodiment, a first amount of the PML-based polyester material 202 is chemically reacted with a second amount of the lactone 212. In some cases, the same number of molar equivalents may be reacted. In other cases, a different number of molar equivalents may be utilized in order to tailor the relative portions of second bottlebrush material 214 that are associated with the different reactants.

As a prophetic example, the PML-based polyester material 202 (0.2 g) and caprolactone (1.0 g) may be dissolved in 100 ml of a hot mixture of tetrahydrofuran and an organic solvent which may include, DMF, DMS, chloroform, chlorobenzene, or NMP. The flask may be sealed under a dry, argon atmosphere, heated to or in excess of 65° C., and triazabicyclodecene (TBD) (2 mg, 0.014 mmol) dissolved in a minimal amount of THF may be added by syringe. After 24 hours, a 10× excess (relative to TBD) of benzoic acid dissolved in a minimal amount of methanol may be added in order to quench the initiator, and the solution may be brought to room temperature. The solution may be added directly to hexane, dropwise, to precipitate the polymer, which may be collected by filtration, and dried in a vacuum oven at >60° C. until complete removal of volatiles (determined by thermogravimetric analysis).

Thus, FIGS. 2A and 2B illustrate an example in which a PML material (synthesized from the biorenewable L-lactide molecule) is modified to include hydroxyl functional groups, and a bottlebrush polymer is grown from the modified PML material using one or more biorenewable, lactones. In some cases, the bottlebrush material depicted in FIG. 2B may be utilized as a standalone biorenewable polymeric material. In other cases, the bottlebrush material depicted in FIG. 2B may be incorporated into a material to increase the biorenewable content of the material.

Figure 3:
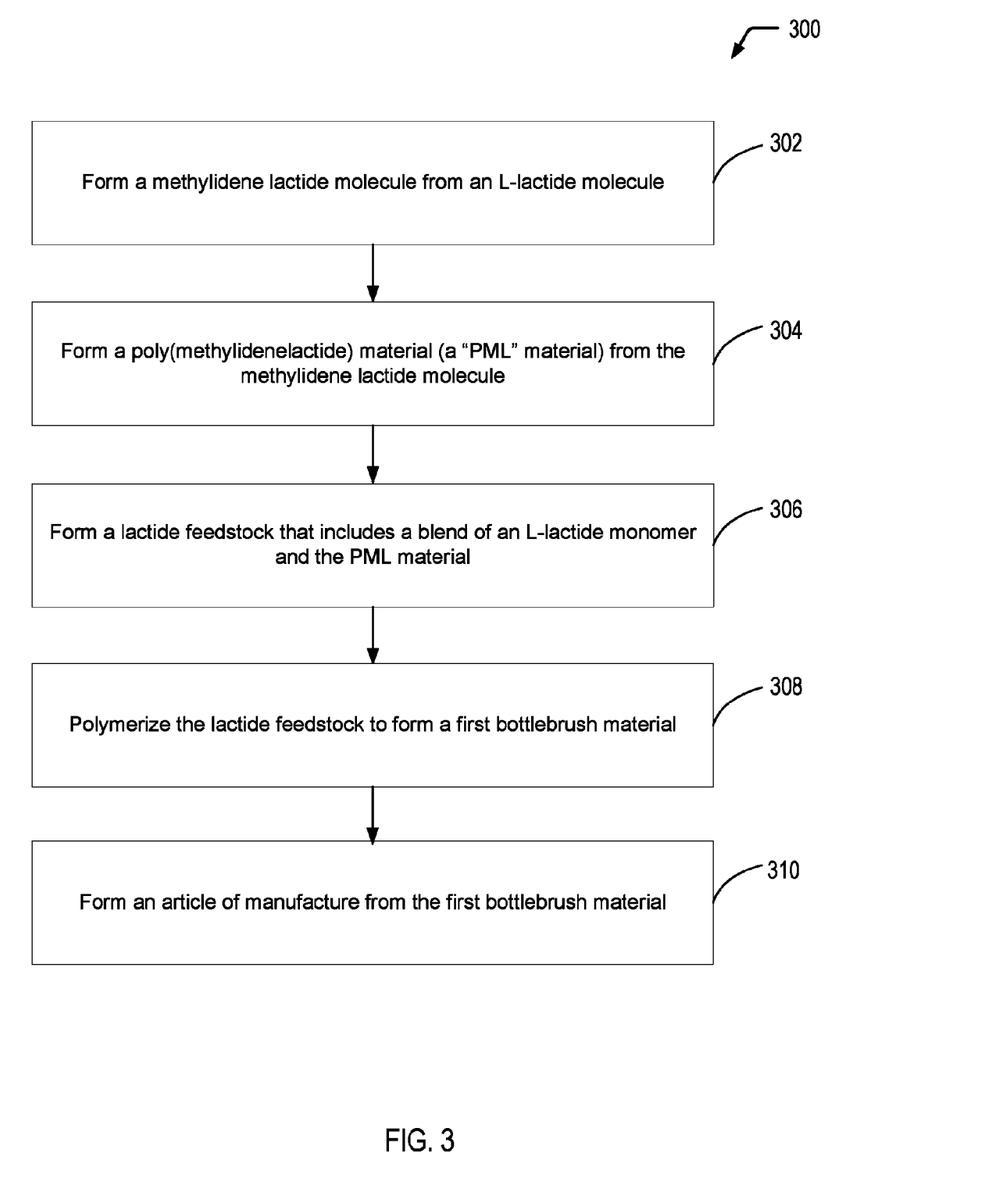
FIG. 3 is a flow diagram depicting a particular embodiment of a process of utilizing a PML material (formed from the biorenewable L-lactide molecule) to synthesize a first example of a bottlebrush polymer.

Referring to FIG. 3, a flow diagram illustrates an example of a process 300 of utilizing a PML material (formed from the biorenewable L-lactide molecule) to synthesize a first example of a bottlebrush polymer, according to one embodiment. In the particular embodiment depicted in FIG. 3, the process 300 further includes forming an article of manufacture from the bottlebrush polymer. It will be appreciated that the operations shown in FIG. 3 are for illustrative purposes only and that the operations may be performed in alternative orders, at alternative times, by a single entity or by multiple entities, or a combination thereof. For example, one entity may form a methylidene lactide molecule from the biorenewable L-lactide molecule and form the PML material from the methylidene lactide molecule (illustrated as operations 302 and 304 in the example of FIG. 3), while another entity may form a blend that includes the PML material and a "conventional" L-lactide monomer and polymerize the blend to form the bottlebrush polymer (illustrated as operations 306 and 308 in FIG. 3). Additionally, in some cases, another entity may form an article of manufacture from the bottlebrush polymer (corresponding to operation 310 in the example of FIG. 3).

The process 300 includes forming a methylidene lactide molecule from an L-lactide molecule, at 302. The process 300 also includes forming a PML material from the methylidene lactide molecule, at 304. For example, referring to FIG. 1A, a multiple-stage process may be used to synthesize the PML material 102 from the biorenewable L-lactide molecule. In the example of FIG. 1A, starting from the biorenewable L-lactide molecule, radical bromination/elimination/radical polymerization reactions may be used to synthesize the PML material 102.

The process 300 includes forming a lactide feedstock blend that includes a blend of an L-lactide monomer and the PML material, at 306. The process further includes polymerizing the lactide feedstock to form a first bottlebrush material, at 308. For example, referring to FIG. 1B, the blend 112 may include a first amount of the L-lactide monomer and a second amount of the PML material 102. In the particular embodiment depicted in FIG. 1B, the first bottlebrush material 114 corresponds to an example of a bottlebrush PLA-PE material. In a particular embodiment, the first bottlebrush material 114 may be synthesized by performing a ring-opening polymerization that includes the use of Lewis acid conditions, such as heating as a melt with a metal catalyst, such as tin(II) octanoate.

In the particular embodiment depicted in FIG. 3, the process 300 further includes forming an article of manufacture from the first bottlebrush material, at 310. To illustrate, in some cases, the first bottlebrush material may be utilized as standalone biorenewable polymeric material. In other cases, the first bottlebrush material may be incorporated into a material to increase the biorenewable content of the material. To illustrate, the first bottlebrush material 114 of FIG. 1B may be incorporated into the material via co-extrusion, injection molding, spin coating, doctor-bladed solutions, or other common techniques. For example, the first bottlebrush material 114 of FIG. 1B may be blended with a polyurethane material, a polycarbonate material, an acrylonitrile butadiene styrene (ABS) material, a polyester material, a polyether material, or a combination thereof (among other alternatives). In cases where the blend includes a non-renewable petroleum-based polymer, the addition of the biorenewable PML-based bottlebrush material 114 of FIG. 1B to the blend may increase the biorenewable content of the article of manufacture formed from the blend.

Thus, FIG. 3 illustrates an example of a process of utilizing a PML material (formed from the biorenewable L-lactide molecule) to synthesize a first example of a bottlebrush polymer. FIG. 3 illustrates that, in some cases, the bottlebrush polymers of the present disclosure may be grown directly from the lactide rings of the PML material using ring-opening polymerization with L-lactide. In the particular embodiment depicted in FIG. 3, the bottlebrush polymer may be incorporated into an article of manufacture to increase the biorenewable content of the article of manufacture.

Figure 4:
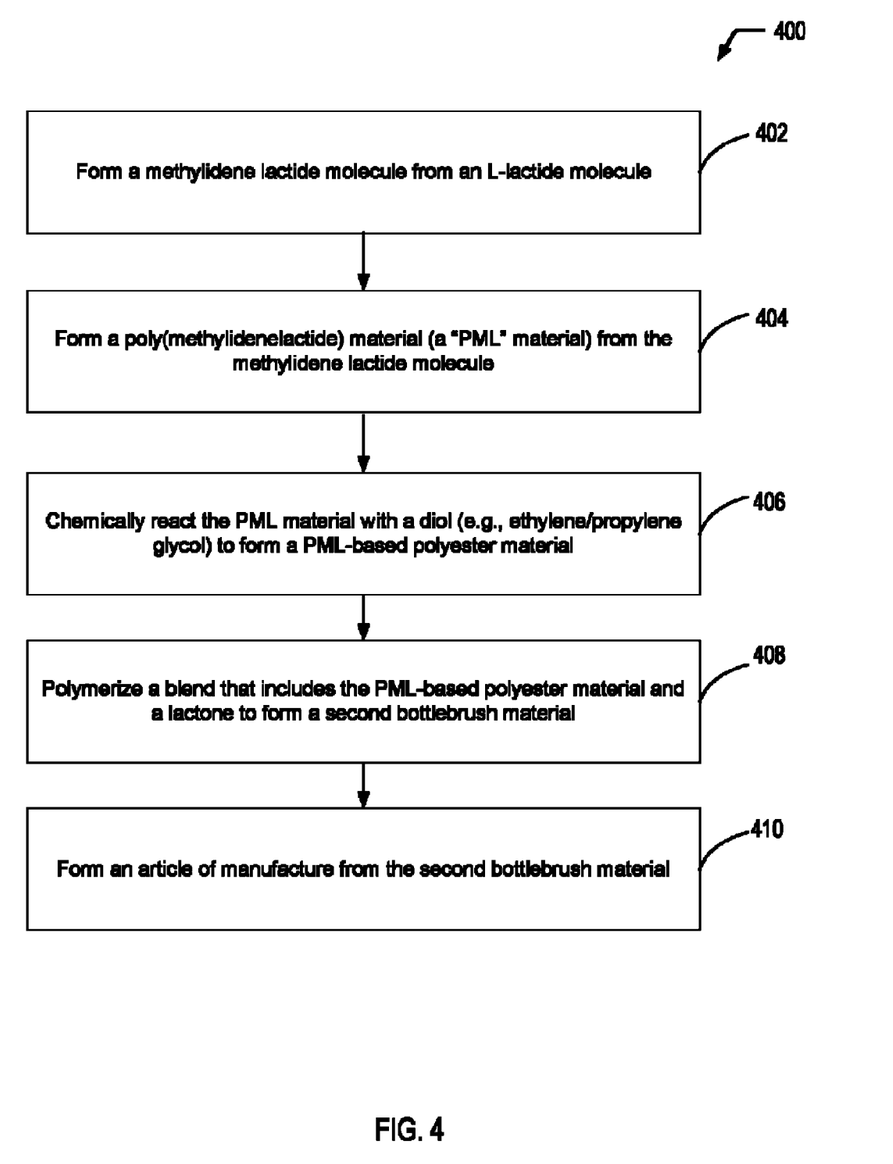
FIG. 4 is a flow diagram depicting a particular embodiment of a process of utilizing a PML material (formed from the biorenewable L-lactide molecule) to synthesize a second example of a bottlebrush polymer.

Referring to FIG. 4, a flow diagram illustrates an example of a process 400 of utilizing a PMA material (formed from the biorenewable L-lactide molecule) to synthesize a second example of a bottlebrush polymer, according to one embodiment. In the particular embodiment depicted in FIG. 4, the process 400 further includes forming an article of manufacture from the bottlebrush polymer. It will be appreciated that the operations shown in FIG. 4 are for illustrative purposes only and that the operations may be performed in alternative orders, at alternative times, by a single entity or by multiple entities, or a combination thereof. For example, one entity may form a methylidene lactide molecule from a biorenewable L-lactide molecule, form the PML material from the methylidene lactide molecule, and form a PML-based polyester material from the PML material using a diol (illustrated as operations 402-406 in the example of FIG. 4). Further, another entity may form a blend that includes the PML-based polyester material and a lactone and polymerize the blend to form the second bottlebrush polymer (illustrated as operation 408 in FIG. 4). Additionally, in some cases, another entity may form an article of manufacture from the second bottlebrush polymer (operation 410 in the example of FIG. 4).

The process 400 includes forming a methylidene lactide molecule from an L-lactide molecule, at 402. The process 400 also includes forming a PML material from the methylidene lactide molecule, at 404. For example, referring to FIG. 1A, a multiple-stage process may be used to synthesize the PML material 102 from the biorenewable L-lactide molecule. In the example of FIG. 1A, starting from the biorenewable L-lactide molecule, radical bromination/elimination/radical polymerization reactions may be used to synthesize the PML material 102.

The process 400 includes chemically reacting the PML material with a diol to form a PML-based polyester material, at 406. For example, referring to FIG. 2A, the PML material 102 formed according to the process described herein with respect to FIG. 1A may be chemically reacted with the diol 204 (e.g., ethylene glycol in the example of FIG. 2A, among other alternatives) to form the PML-based polyester material 202. As described herein with respect to FIG. 2A, converting the lactide ring on the PML material 102 into a terminal alcohol may include performing a base-catalyzed or acid-catalyzed ring-opening polymerization of the PML material 102 in the presence of the diol 204.

The process 400 further includes polymerizing a blend that includes the PML-based polyester material and a lactone to form a second bottlebrush material, at 408. For example, FIG. 2B illustrates an example of a renewable polyester that may be grown from the terminal hydroxyl groups of the PML-based polyester material 202 of FIG. 2A using the lactone 212. As previously described herein, with respect to the lactone 212 depicted in FIG. 2B, the integer y is used to illustrate that various lactones or combinations of lactones may include different numbers of carbon atoms in the lactone ring. As an illustrative, non-limiting example, the lactone 212 may correspond to a renewable lactone, such as caprolactone.

In the particular embodiment depicted in FIG. 4, the process 400 further includes forming an article of manufacture from the second bottlebrush material, at 410. To illustrate, in some cases, the second bottlebrush material 214 of FIG. 2B may be utilized as standalone biorenewable polymeric material. In other cases, the second bottlebrush material 214 of FIG. 2B may be incorporated into a material to increase the biorenewable content of the material. To illustrate, the second bottlebrush material 214 of FIG. 2B may be incorporated into the material via co-extrusion, injection molding, spin coating, doctor-bladed solutions, or other common techniques. For example, the second bottlebrush material 214 of FIG. 2B may be blended with a polyurethane material, a polycarbonate material, an ABS material, a polyester material, a polyether material, or a combination thereof (among other alternatives). In cases where the blend includes a non-renewable petroleum-based polymer, the addition of the biorenewable PML-based bottlebrush material 214 of FIG. 2B to the blend may increase the biorenewable content of the article of manufacture formed from the blend.

Thus, FIG. 4 illustrates an example of a process of modifying a PML material (formed from the biorenewable L-lactide molecule), and utilizing the modified PML-based material to synthesize a second example of a bottlebrush polymer. FIG. 4 illustrates that, in some cases, the bottlebrush polymers of the present disclosure may be grown from a modified PML material using biorenewable lactones. In the particular embodiment depicted in FIG. 4, the bottlebrush polymer may be incorporated into an article of manufacture to increase the biorenewable content of the article of manufacture.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming a bottlebrush polymer, the process comprising:
    forming a poly(methylidenelactide) (PML) material from an L-lactide molecule, the PML material having a polymeric repeat unit that includes a lactide group;
    blending a first amount of an L-lactide monomer and a second amount of the PML material to form a lactide feedstock; and
    polymerizing the lactide feedstock to form a bottlebrush polymer.

2. The process of claim 1, wherein the bottlebrush polymer is a poly(lactic acid)-polyethylene (PLA-PE) material, the process further comprising adjusting a polyethylene portion of the PLA-PE material by varying the second amount of the PML material.

3. The process of claim 1, wherein polymerizing the lactide feedstock includes initiating a ring-opening polymerization reaction.

4. The process of claim 3, wherein the ring-opening polymerization reaction includes chemically reacting the lactide feedstock with a tin(II) octanoate material.

5. The process of claim 1, wherein forming the PML material from the L-lactide molecule includes:
    forming a methylidene lactide molecule from the L-lactide molecule; and
    initiating a radical polymerization reaction using a radical initiator to form the PML material from the methylidene lactide molecule.

6. The process of claim 5, wherein the radical initiator is azobisisobutyronitrile (AIBN).

7. A process of forming a bottlebrush polymer, the process comprising:
    forming a mixture that includes a poly(methylidenelactide) (PML) material and a diol, the PML material having a polymeric repeat unit that includes a lactide group;

performing a ring-opening polymerization reaction on the mixture to form a PML-based polyester material; and
chemically reacting the PML-based polyester material with a lactone to form a bottlebrush polymer.

8. The process of claim 7, wherein the ring-opening polymerization reaction includes a base-catalyzed ring-opening polymerization reaction of the PML material in the presence of the diol.

9. The process of claim 7, wherein the ring-opening polymerization reaction includes an acid-catalyzed ring-opening polymerization reaction of the PML material in the presence of the diol.

10. The process of claim 7, wherein the diol is ethylene glycol.

11. The process of claim 7, wherein the diol is propylene glycol.

12. The process of claim 7, wherein the lactone is β-propiolactone, γ-butyrolactone, δ-valerolactone, ε-caprolactone, or a combination thereof.

13. The process of claim 7, wherein the lactone is a biorenewable lactone.

14. The process of claim 7, further comprising:
forming a methylidene lactide molecule from a biorenewable L-lactide molecule; and
initiating a radical polymerization reaction using a radical initiator to form the PML material from the methylidene lactide molecule.

15. A process of forming a bottlebrush polymer, the process comprising:
initiating a radical polymerization reaction using a radical initiator to form a poly(methylidenelactide) (PML) material from a methylidene lactide molecule, the PML material having a polymeric repeat unit that includes a lactide group;
forming a mixture that includes the PML material or a PML-based polyester material derived from the PML material; and
polymerizing the mixture to form a bottlebrush polymer.

16. The process of claim 15, wherein:
the radical initiator is azobisisobutyronitrile (AIBN);
the mixture includes a blend of an L-lactide monomer and the PML material;
polymerizing the mixture includes initiating a ring-opening polymerization reaction; and
wherein the bottlebrush polymer is a poly(lactic acid)-polyethylene (PLA-PE) material.

17. The process of claim 15, further comprising forming the PML-based polyester material by performing a ring-opening polymerization reaction on the PML material in the presence of a diol.

18. The process of claim 17, wherein the diol is ethylene glycol.

19. The process of claim 17, wherein the mixture includes a lactone and the PML-based polyester material derived from the PML material.

20. The process of claim 19, wherein the lactone is biorenewable ε-caprolactone.

\* \* \* \* \*